(12) United States Patent
Szot

(10) Patent No.: US 10,172,329 B2
(45) Date of Patent: Jan. 8, 2019

(54) TURTLE BASKING PLATFORM

(71) Applicant: Skyler Szot, Farmington, CT (US)

(72) Inventor: Skyler Szot, Farmington, CT (US)

( * ) Notice: Subject to any disclaimer, the term of this patent is extended or adjusted under 35 U.S.C. 154(b) by 181 days.

(21) Appl. No.: 15/336,733

(22) Filed: Oct. 27, 2016

(65) Prior Publication Data

US 2018/0116183 A1     May 3, 2018

(51) Int. Cl.
*A01K 61/00* (2017.01)
*B63B 38/00* (2006.01)
*A01K 29/00* (2006.01)

(52) U.S. Cl.
CPC .............. *A01K 61/00* (2013.01); *A01K 29/00* (2013.01); *B63B 38/00* (2013.01); *A01K 2227/50* (2013.01); *B63B 2205/00* (2013.01); *B63B 2207/00* (2013.01)

(58) Field of Classification Search
CPC .... A01K 61/00; A01K 2227/50; A01K 29/00; A01K 61/60; A01K 63/00; B63B 38/00; B63B 2205/00; B63B 2207/00
USPC ..... 119/200, 239, 28.5, 57.8, 253, 256, 702, 119/705, 706, 754, 757, 843, 847, 174; 4/496–497; 446/153; 434/297
See application file for complete search history.

(56) References Cited

U.S. PATENT DOCUMENTS

| 3,141,442 | A | * | 7/1964 | Harris | A01K 63/006 119/246 |
| 3,699,921 | A | * | 10/1972 | Janicek | A01K 63/006 119/246 |
| 3,804,064 | A | * | 4/1974 | Kuneman | A01K 63/006 119/246 |
| 3,952,521 | A | * | 4/1976 | Potter | E02B 3/062 405/27 |
| 4,437,259 | A | * | 3/1984 | Holyoak | A01K 69/08 43/105 |
| 4,712,944 | A | * | 12/1987 | Rose | E02B 3/062 405/26 |
| D315,230 | S | * | 3/1991 | Cronk | D30/106 |
| 5,121,709 | A | * | 6/1992 | Wechsler | A01K 63/006 119/246 |
| 5,722,347 | A | * | 3/1998 | Tominaga | A01K 63/006 119/245 |
| 6,532,899 | B1 | * | 3/2003 | Hootman | A01K 63/006 119/246 |
| 6,643,879 | B1 | * | 11/2003 | Davis | A01K 15/02 14/69.5 |
| 2005/0145190 | A1 | * | 7/2005 | Bagnall | A01K 63/006 119/253 |
| 2005/0183331 | A1 | * | 8/2005 | Kania | A01G 9/00 47/65.5 |
| 2007/0277743 | A1 | * | 12/2007 | Bagnall | A01K 63/006 119/253 |
| 2009/0139161 | A1 | * | 6/2009 | Teckam | E04F 11/0255 52/182 |

(Continued)

*Primary Examiner* — Sarah B McPartlin
(74) *Attorney, Agent, or Firm* — Chen-Chi Lin

(57) ABSTRACT

A basking platform for reptiles and amphibians, in particular turtles, includes at least one portion of the platform elevated from the water to allow for basking, a floatation device to elevate the platform and ensure stability, at least one ramp partially submerged in the water to allow for reptiles and amphibians to climb on, a textured coating to allow easier grip, and at least one anchor to secure the platform in position.

20 Claims, 5 Drawing Sheets

(56) References Cited

U.S. PATENT DOCUMENTS

2010/0223845 A1* 9/2010 Felling ................. A01K 63/006
　　　　　　　　　　　　　　　　　　　　　　47/66.7
2011/0114030 A1* 5/2011 Perreira ............... A01K 63/006
　　　　　　　　　　　　　　　　　　　　　　119/247

* cited by examiner

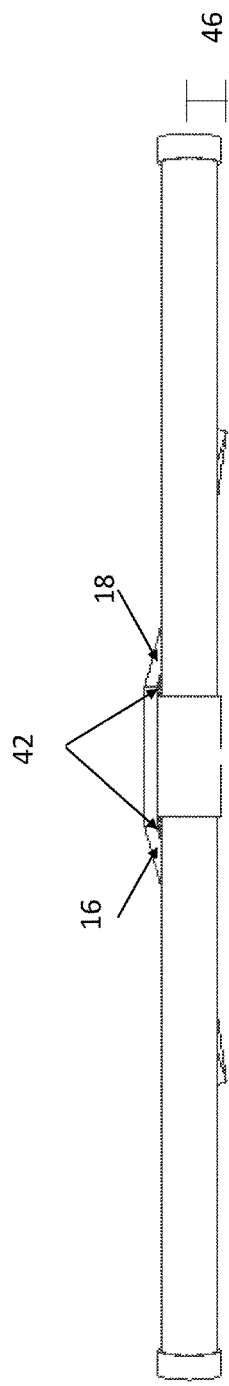

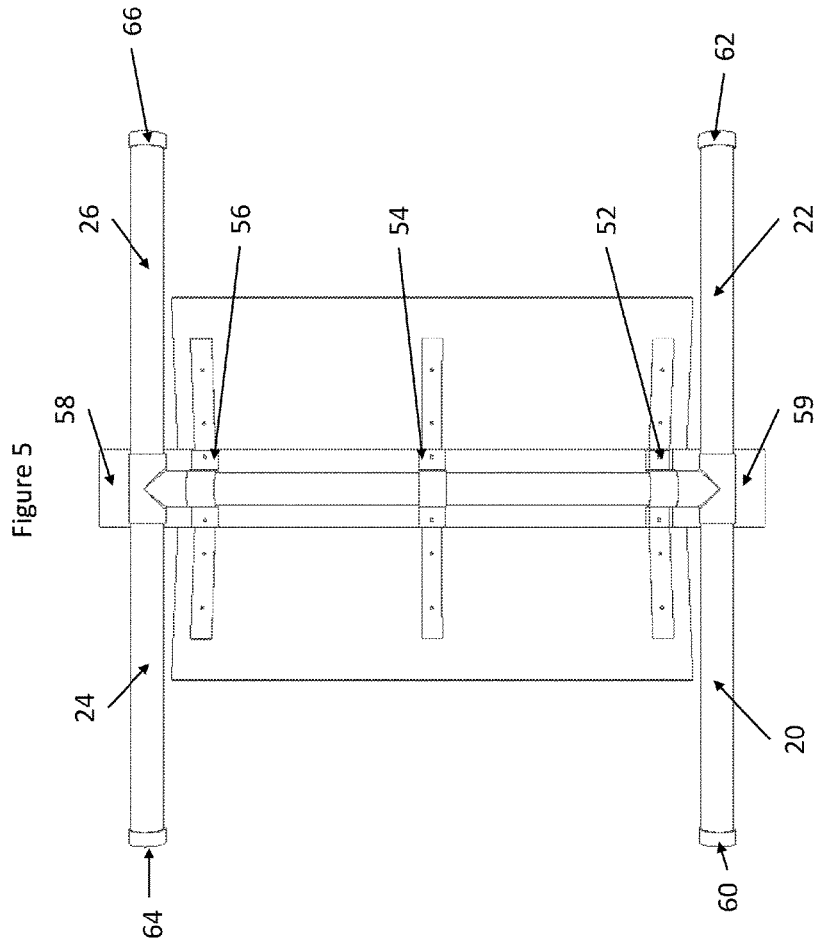

TURTLE BASKING PLATFORM

FIELD

The present invention relates to reptile and amphibian structures and particularly for a structure for turtle basking.

BACKGROUND

Reptiles are cold blooded, meaning that they must regulate their internal body temperatures through their environment. They accomplish this by basking on objects elevated from the water in the sun to warm themselves, and foraging for food underwater or in the shade to cool themselves. Reptiles typically cycle between warming and cooling a few times a day. Turtles in particular can typically be seen basking on logs in shallow ponds rather than the shoreline, because logs are out of the shade, and have greater safety from predators. For turtles, basking also includes benefits such as killing algae and fungus, and strengthening the shell.

Currently, there are no commercially available reptile and amphibian basking platforms, and the only alternative are logs, which pose a few issues. First, a log large enough to allow turtles to bask is very heavy and difficult to move. Also, this is merely the dry weight, and the logs become even heavier after being submerged, making it even more difficult to remove. In addition, logs must rest on the bottom of the water body, limiting the depth at which you can place them. Finally, logs decompose in a marine environment requiring constant replacement.

SUMMARY

In a broad aspect of the invention a reptile and amphibian basking platform for supporting a reptile in particular, a turtle includes: a buoyant base to allow flotation in deeper water, and outriggers to prevent rolling over due to disproportionate turtle distribution on the platform, an anchor to prevent drifting away from the intended location, two sloped sides descending into the water to allow reptiles and amphibians to get on the platform, and a textured coating to allow better grip for reptiles and amphibians.

In an aspect of the invention, the main structural component of the platform is also the flotation device, which allows for placement in deeper water, structural support for the platform, and partial elevation from the water.

In a further aspect of the invention the flotation device is shaped to prevent rolling over of the platform due to waves or disproportionate reptile or amphibian distribution.

In an aspect of the invention an anchor secures the platform in its desired position.

In an aspect of the invention at least one ramp is supported by, and elevated from the water by the flotation device, and angled down to be partially submerged in the water, to allow reptiles and amphibians to climb on.

In an aspect of the invention the ramps are textured to allow reptiles and amphibians to more easily grip the surface.

In a final aspect of the invention, the ramps are secured to the flotation device to ensure stability.

BRIEF DESCRIPTION OF THE DRAWINGS

FIG. 4 shows a side view, which is the side with the outrigger, of the reptile and amphibian platform shown in FIG. 1

FIG. 5 shows a bottom view of the reptile and amphibian platform shown in FIG. 1

DETAILED DESCRIPTION

Described herein is a structure for turtle basking in bodies of water. The structure is also suitable for other reptiles and amphibians who bask. The term reptile is used herein for convenience.

The system of the invention includes the use of an anchored flotation device, a semi submerged angled platform, and a textured surface, the details of which are provided below.

Figure 1:
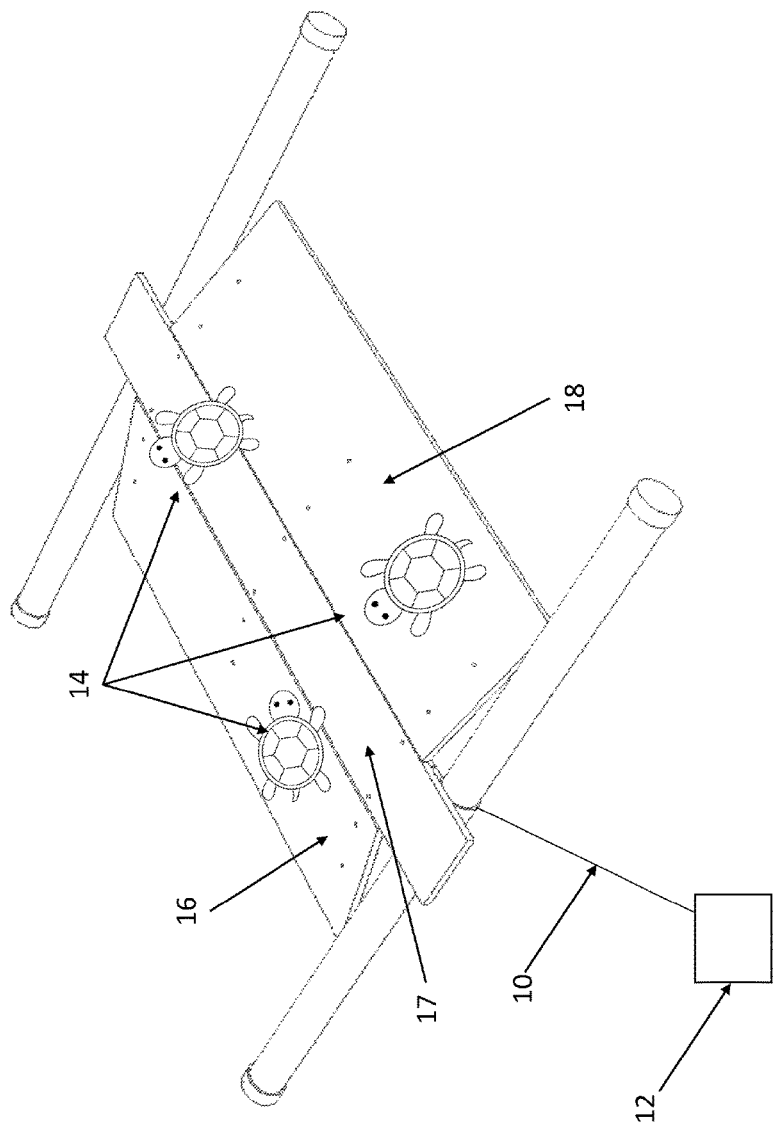
FIG. 1 shows a perspective view of a reptile and amphibian platform according to the present invention

FIG. 1 shows a basking platform as it would look in use. A rope 10 is secured to the underside of the floatation device, which then extends a variable depth to an anchor 12, such as a cinderblock, resting on the floor of the waterbody. Additionally, this figure depicts reptiles 14 utilizing the platforms three basking surfaces 16 17 18. More than one reptile can use each basking surface, but only one is depicted on each for the simplicity of the drawing. The three differing angles allows reptiles to reposition themselves based on the position of the sun.

Figure 2:
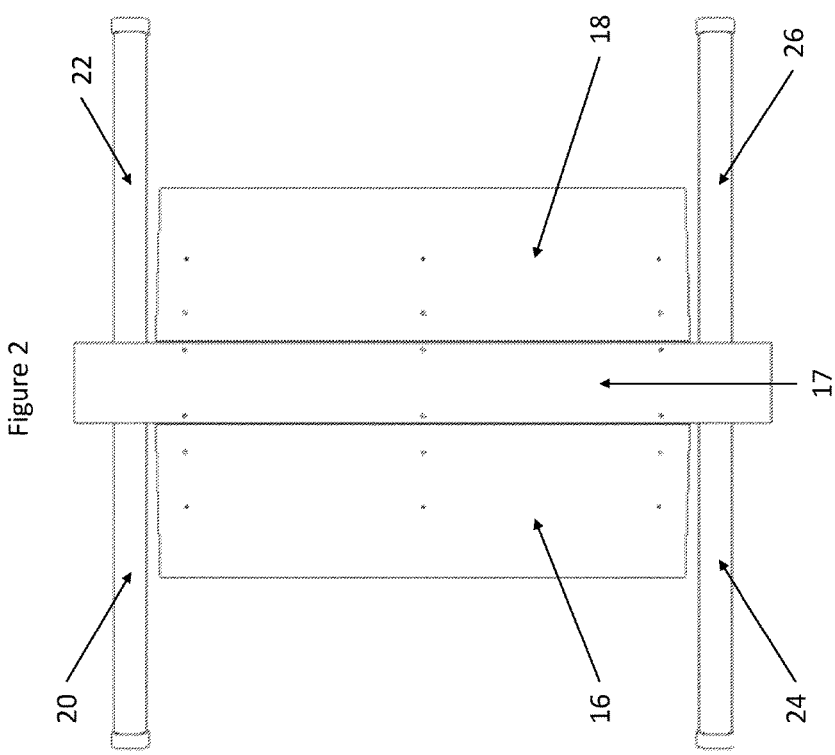
FIG. 2 shows a top view of the reptile and amphibian platform shown in FIG. 1

FIG. 2 depicts a basking platform according to an aspect of the invention. The basking surfaces 16 17 18 are built to predetermined proportions to accommodate multiple reptiles per platform. For example, approximately 6 square feet of basking surface can accommodate 12 painted turtles. The proportions refer to the total area of the platform both submerged and elevated from the water body. This area 16 17 18 is also textured to allow greater traction to reptiles attempting to climb onto the platform. The textured surface could be molded in a textured pattern, have glue and gravel, a reptile carpet, or any other surface which allows reptiles to grip the surface. In examples of the present disclosure, textured surface is caulk to allow better grip to reptiles and amphibians. The caulk is water resistant to ensure durability. Additionally, FIG. 2 depicts the outriggers 20 22 24 26 of the flotation device of the platform, which partially elevates it from the water body and provides support from rolling over. Depicted are 2 inch PVC pipes and 2 foot outriggers. PVC does not necessarily have to be used or the flotation device, wood or foam or any other buoyant material would suffice, although PVC is the most durable, lightweight, and water resistant. Also, the outriggers 20 22 24 26 can vary in length depending on the waviness of the waterbody and size and quantity of reptiles, but all four outriggers 20 22 24 26 will be the same length.

Figure 3:
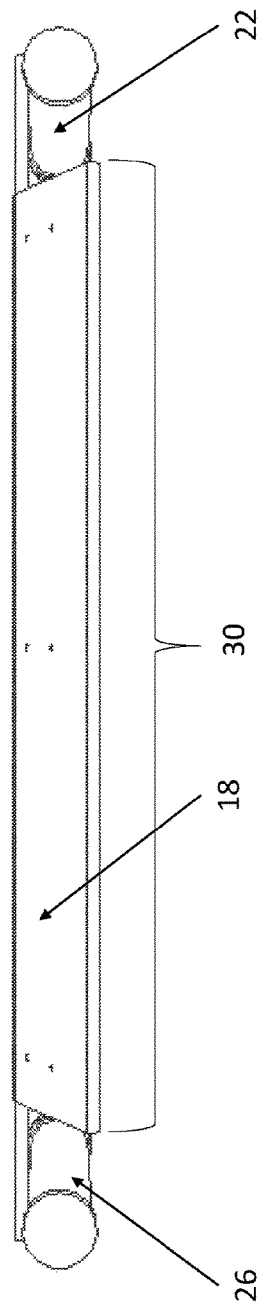
FIG. 3 shows a front view, which is the side with the ramp, of the reptile and amphibian platform shown in FIG. 1

FIG. 3 depicts a basking platform according to another aspect of the invention. The back of the platform is identical to the front which is depicted. The angled basking surface 18 which extends into the water is nearly the entire length of the platform to allow multiple reptiles to use the platform simultaneously. For example, a 3-foot-wide ramp can accommodate approximately 6 painted turtles. The width 30 of the ramp 16 could be adjusted to accommodate the size and quantity of reptiles. Additionally, the flotation device and outriggers 22 26 are built to impede minimally on the reptiles, while still providing sufficient support. The outriggers 22 26 extend perpendicular to the ramps to minimize the basking surface blocked by the flotation device, without compromising the stability of the structure. Depicted is one possible configuration for the flotation device, but any configuration could be used as long as it provides stability and does not impede the basking surfaces.

FIG. 4 depicts an additional aspect of the invention. The ramps 16 18 are angled so that reptiles are able to access the platform from the water. The ramps have an angle 42 and depth 46 appropriate for the target species of reptile. For example, painted turtles should have a ramp that extends at least and inch below the surface and an angle of approximately 15 degrees. Additionally, there is a ramp 16 18 on both sides of the platform, which maximizes basking area for reptiles, as well as viewing angles for 100 observers. The platform is not limited to two ramps, but it is most appropriate for this configuration.

FIG. 5 depicts another aspect of the invention. The invention is built with the flotation device and outriggers 20 22 24 26 secured to the platform at multiple positions. Any type of device 52 54 56 can be used to secure the flotation device, but something 105 water resistant and durable is most preferable, such as aluminum brackets and bolts. Also, in this configuration, the flat surface 58 59 extends over and sits on the flotation device to prevent spinning of the platform on the flotation device. Finally, depending on the flotation device used it could be capped 60 62 64 66 and filled with air, filled with foam or any other substance and capped, or not need further modifications.

What is claimed is:

1. A reptile and amphibian basking platform comprising
   a base providing buoyancy and stability, the base comprising
      a first outrigger extending along a first direction;
      a second outrigger extending along the first direction;
      a third outrigger extending along the first direction; and
      a fourth outrigger extending along the first direction;
   an anchor;
   a rope having a first end directly attached to the base and a second end directly attached to the anchor;
   a basking member comprising a first end, a middle section, and a second end opposite the first end, the basking member extending along a second direction perpendicular to the first direction, and the basking member being attached to the base; and
   one or more sloped ramps, a lower end of each of the one or more sloped ramps being configured to descend into water, and a top surface of each of the one or more sloped ramps is a textured surface;
   wherein the one or more sloped ramps are directly attached to the middle section of the basking member;
   wherein the first outrigger and the second outrigger are closer to the first end of the basking member than to the second end the basking member;
   wherein the third outrigger and the fourth outrigger are closer to the second end of the basking member than to the first end the basking member;
   wherein a portion of the first end of the basking member extends beyond the first outrigger and the second outrigger; and
   wherein a portion of the second end of the basking member extends beyond the third outrigger and the fourth outrigger.

2. The reptile and amphibian basking platform of claim 1, wherein the first outrigger, the second outrigger, the third outrigger, and the fourth outrigger are made of a PVC material.

3. The reptile and amphibian basking platform of claim 2, wherein the base is an I shaped configuration.

4. The reptile and amphibian basking platform of claim 3, wherein said I shaped configuration is filled with air and capped and sealed to ensure buoyancy.

5. The reptile and amphibian basking platform of claim 4, wherein the one or more sloped ramps comprises a first sloped ramp and a second sloped ramp.

6. The reptile and amphibian basking platform of claim 5, wherein the first sloped ramp and the second sloped ramp are symmetric with respect to a centerline of the basking member; and
   wherein the centerline of the basking member is parallel to the second direction.

7. The reptile and amphibian basking platform of claim 6, wherein the lower end of each of the one or more sloped ramps is configured to be lower than a top surface of the water by one to two inches.

8. The reptile and amphibian basking platform of claim 6, wherein each of the one or more sloped ramps is configured to have a shallow angle between a corresponding ramp surface of the one or more sloped ramps and a top surface of the water.

9. The reptile and amphibian basking platform of claim 1, wherein the one or more sloped ramps are made of a PVC material.

10. The reptile and amphibian basking platform of claim 1, wherein the textured surface is caulk.

11. The reptile and amphibian basking platform of claim 10, wherein the caulk is water resistant.

12. The reptile and amphibian basking platform of claim 1, wherein the one or more sloped ramps comprise a first sloped ramp and a second sloped ramp; and
    wherein a top surface of the basking member, the top surface of first sloped ramp and the top surface of the second sloped ramp are basking surfaces.

13. The reptile and amphibian basking platform of claim 12, wherein the top surface of the basking member is horizontal so that the top surface of the basking member is configured to be parallel to a top surface of the water;
    wherein the first sloped ramp is directly attached to a first side of the middle section of the basking member; and
    wherein the second sloped ramp is directly attached to a second side of the middle section of the basking member opposite the first side of the middle section of the basking member.

14. The reptile and amphibian basking platform of claim 1, wherein the basking member is attached to the base by a first plurality of bolts and brackets; and
    wherein the one or more sloped ramps are directly attached to the middle section of the basking member by a second plurality of bolts and brackets.

15. The reptile and amphibian basking platform of claim 14, wherein the first plurality of bolts and brackets and the second plurality of bolts and brackets are made of an aluminum material.

16. The reptile and amphibian basking platform of claim 1, wherein the basking member is made of a PVC material.

17. The reptile and amphibian basking platform of claim 1, wherein the top surface of each of the one or more sloped ramps is configured to form a fifteen-degree angle with respect to a top surface of the water.

18. The reptile and amphibian basking platform of claim 1, wherein the first end of the rope is directly attached to the first outrigger.

19. The reptile and amphibian basking platform of claim 1, wherein the first outrigger, the second outrigger, the third outrigger and the fourth outrigger are filled with foam and are capped.

20. The reptile and amphibian basking platform of claim 1, wherein the first outrigger, the second outrigger, the third outrigger and the fourth outrigger are of a same length.

* * * * *